(12) United States Patent  (10) Patent No.: US 7,418,236 B2
Levin et al. (45) Date of Patent: Aug. 26, 2008

(54) EXTRATERRESTRIAL COMMUNICATIONS SYSTEMS AND METHODS INCLUDING ANCILLARY EXTRATERRESTRIAL COMPONENTS

(75) Inventors: Lon C. Levin, Washington, DC (US); Peter D. Karabinis, Cary, NC (US)

(73) Assignee: Mobile Satellite Ventures, LP, Reston, VA (US)

( * ) Notice: Subject to any disclaimer, the term of this patent is extended or adjusted under 35 U.S.C. 154(b) by 0 days.

(21) Appl. No.: 10/827,961

(22) Filed: Apr. 20, 2004

(65) Prior Publication Data

US 2005/0239457 A1 Oct. 27, 2005

(51) Int. Cl.
*H04B 7/185* (2006.01)

(52) U.S. Cl. ............... 455/12.1; 455/431; 455/427; 455/430

(58) Field of Classification Search .......... 455/12.1, 455/431, 430, 13.1, 427, 412.1, 522, 524, 455/63.1, 422.1, 13.3; 370/345, 320; 342/352, 342/120, 351; 709/223
See application file for complete search history.

(56) References Cited

U.S. PATENT DOCUMENTS

| 4,684,955 | A | * | 8/1987 | Adams et al. ............... 342/351 |
| 4,901,307 | A | | 2/1990 | Gilhousen et al. |
| 5,073,900 | A | | 12/1991 | Mallinckrodt |
| 5,303,286 | A | | 4/1994 | Wiedeman |
| 5,339,330 | A | | 8/1994 | Mallinckrodt |
| 5,394,561 | A | | 2/1995 | Freeburg |
| 5,446,756 | A | | 8/1995 | Mallinckrodt |
| 5,448,623 | A | | 9/1995 | Wiedeman et al. |
| 5,511,233 | A | | 4/1996 | Otten |
| 5,555,257 | A | | 9/1996 | Dent |

(Continued)

FOREIGN PATENT DOCUMENTS

EP 0 506 255 A2 9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Matthew D. Anderson
*Assistant Examiner*—Tan Trinh
(74) *Attorney, Agent, or Firm*—Myers, Bigel, Sibley & Sajovec, P.A.

(57) ABSTRACT

A system for communications on an extraterrestrial body may include a space-based component and an ancillary extraterrestrial component on the extraterrestrial body. The space-based component may be configured to provide wireless communications with a plurality of radioterminals located on the extraterrestrial body over a satellite frequency band wherein the space-based component includes at least one satellite orbiting the extraterrestrial body. The ancillary extraterrestrial component may be configured to provide wireless communications with the plurality of radioterminals located on the extraterrestrial body. Moreover, the ancillary extraterrestrial component may reuse at least one satellite frequency of the satellite frequency band, and the space-based component and the ancillary extraterrestrial component may be configured to relay communications therebetween. Related methods are also discussed.

37 Claims, 4 Drawing Sheets

U.S. PATENT DOCUMENTS

| | | | |
|---|---|---|---|
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A * | 2/2000 | Sasaki et al. | 455/12.1 |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 * | 4/2006 | Karabinis et al. | 455/427 |
| 7,248,342 B1 * | 7/2007 | Degnan | 356/5.01 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0012180 A1 * | 1/2003 | Donahue et al. | 370/352 |
| 2003/0022625 A1 | 1/2003 | Otten et al. | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0081587 A1 * | 5/2003 | Ichiyoshi | 370/345 |
| 2003/0114102 A1 * | 6/2003 | Golding | 455/12.1 |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0147257 A1 * | 7/2004 | Phillips et al. | 455/427 |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 * | 10/2005 | Karabinis et al. | 455/13.3 |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260948 A1 * | 11/2005 | Regulinski et al. | 455/12.1 |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |
| 2006/0282520 A1 * | 12/2006 | Hickman et al. | 709/223 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Ayyagari et al., "A satellite-augmented cellular network concept", *Wireless Networks*, Vo. 4, 1998. pp. 189-198.

Mars Exploration Rover Mission, Communications with Earth "How the rovers can communicate through Mars-orbiting spacecraft"; http://marsrovers.jpl.nasa.gov/mission/comm_orbiters.html, NASA, Jet Propulsion Laboratory, California Institute of Technology, Mar. 19, 2004.

Mars Exploration Rover Mission, Spacecraft: Surface Operations: Rover "The rover's antennas"; http://marsrovers.jpl.nasa.gov/mission/spacecraft_rover_antennas.html, NASA, Jet Propulsion Laboratory, California Institute of Technology, Mar. 19, 2004.

* cited by examiner

EXTRATERRESTRIAL COMMUNICATIONS SYSTEMS AND METHODS INCLUDING ANCILLARY EXTRATERRESTRIAL COMPONENTS

FIELD OF THE INVENTION

This invention relates to communications systems and methods, and more particularly to extraterrestrial communications systems and methods.

BACKGROUND OF THE INVENTION

Interplanetary communications are provided for various spacecraft being sent, for example to Mars. Communications for the Mars Exploration Rover Mission are discussed, for example, in the following Web publications by the NASA Jet Propulsion Laboratory at the California Institute of Technology: (1) "*Mars Exploration Rover Mission, Spacecraft: Surface Operations: Rover, The rover's antennas*," marsrovers.jpl.nasa.gov/mission/spacecraft_rover_antennas.html; and (2) "*Mars Exploration Rover Mission: Communications With Earth: How the rovers can communicate through Mars-orbiting spacecraft*," marsrovers.jpl.nasa.gov/mission/comm._orbiters.html. The disclosures of both of these publications are hereby incorporated herein in their entirety by reference.

In the on-going Mars Rover mission, a rover on the surface of Mars can communicate either directly with Earth or through a Mars-orbiting spacecraft. More particularly, a rover on the surface of Mars can transmit communications directly to one or more Deep Space Network antennas on Earth. A rover on Mars can also uplink information to a spacecraft orbiting Mars, and the information can then be passed from the spacecraft orbiting Mars to Earth. The spacecraft orbiting Mars can also send information to the rover on Mars.

Potential benefits of using an orbiting spacecraft may include: (1) that the orbiting spacecraft is closer to the rover than the Deep Space Network antennas on Earth; and (2) that the spacecraft orbiting Mars has the Earth in view for a longer and/or a more frequently occurring time period than the rover on the surface of Mars. Moreover, the rover may not have to use as much energy to send a communication to a spacecraft orbiting Mars as may be required to send a communication to an antenna on earth.

Improved communications systems and methods, however, may be desired to accommodate increasing communications to and from extraterrestrial bodies such as the Moon and/or Mars as more missions are sent to extraterrestrial bodies. More particularly, communications systems and methods may be desired that can accommodate increased communications between radioterminals on an extraterrestrial body and increased communications between radioterminals on the extraterrestrial body and a satellite orbiting a celestial body and/or transceivers on earth.

SUMMARY OF THE INVENTION

According to first embodiments of the present invention, a system for communications on an extraterrestrial body may include a space-based component having at least one satellite orbiting the extraterrestrial body and an ancillary extraterrestrial component on the extraterrestrial body. The space-based component may be configured to provide wireless communications with a plurality of radioterminals located on the extraterrestrial body over a satellite frequency band. The ancillary extraterrestrial component may be configured to provide wireless communications with the plurality of radioterminals located on the extraterrestrial body. Moreover, the ancillary extraterrestrial component may reuse at least one satellite frequency of the satellite frequency band, and the space-based component and the ancillary extraterrestrial component may be configured to relay communications therebetween.

The space-based component may be configured to relay communications between first and second radioterminals on the extraterrestrial body using at least one satellite frequency of the satellite frequency band. The ancillary extraterrestrial component may be configured to relay communications between first and second radioterminals on the extraterrestrial body reusing the at least one satellite frequency of the satellite frequency band. In addition, the ancillary extraterrestrial component and the space-based component may be configured to relay communications between first and second terminals on the extraterrestrial body such that communications between the first and second radioterminals are relayed through both the ancillary extraterrestrial component and the space-based component. At least one of the radioterminals may be configured to provide full duplex voice communications and/or digital data communications.

The ancillary extraterrestrial component may be one of a plurality of ancillary extraterrestrial components on the extraterrestrial body with each ancillary extraterrestrial component defining a respective coverage area on the extraterrestrial body. More particularly, the ancillary extraterrestrial components may reuse one or more of frequencies of the satellite frequency band. The one or more frequencies may be shared among the plurality of ancillary extraterrestrial components according to a frequency reuse pattern to reduce interference between the ancillary extraterrestrial components.

The systems may also include a second space-based component that is configured to provide wireless communications with a plurality of radioterminals located on earth over a second satellite frequency band. Moreover, the second space-based component may include at least one satellite orbiting the earth, and the first space-based component, the second space-based component, and the ancillary extraterrestrial component may be configured to relay communications therebetween. In addition, an ancillary terrestrial component on earth may be configured to provide wireless communications with the plurality of radioterminals located on earth, and the ancillary terrestrial component may reuse at least one satellite frequency of the second satellite frequency band, and the second space-based component and the ancillary terrestrial component may be configured to relay communications therebetween. Moreover, the first satellite frequency band and the second satellite frequency band may be substantially the same satellite frequency band.

The ancillary extraterrestrial component on the extraterrestrial body and the ancillary terrestrial component on earth may also be configured to relay communications between a radioterminal on earth and a radioterminal on the extraterrestrial body. More particularly, communications between the radioterminal on earth and the radioterminal on the extraterrestrial body may be relayed through both the ancillary extraterrestrial component and ancillary terrestrial component. In addition or in an alternative, communications between the radioterminal on earth and the radioterminal on the extraterrestrial body may be relayed through the first and/or second space-based components. In addition or in another alternative, communications between the radioterminal on earth and the radioterminal on the extraterrestrial body may be relayed through both the first space-based component and the ancillary terrestrial component. In addition or in yet another alternative, communications between the radioterminal on earth and the radioterminal on the extraterrestrial body may be relayed through both the ancillary extraterrestrial component and the second space-based component.

According to second embodiments of the present invention, an extraterrestrial communications system may include a first space-based component having at least one satellite orbiting the extraterrestrial body, an ancillary extraterrestrial component on the extraterrestrial body, a second space-based component having at least one satellite orbiting earth, and an ancillary terrestrial component on earth. The first space-based component may be configured to provide wireless communications with a plurality of radioterminals located on an extraterrestrial body. The ancillary extraterrestrial component on the extraterrestrial body may be configured to provide wireless communications with the plurality of radioterminals located on the extraterrestrial body. Moreover, the first space-based component and the ancillary extraterrestrial component may be configured to relay communications therebetween. The second space-based component may be configured to provide wireless communications with a plurality of radioterminals located on earth. The ancillary terrestrial component on earth may be configured to provide wireless communications with the plurality of radioterminals located on earth, and the second space-based component and the ancillary terrestrial component may be configured to relay communications therebetween. In addition, the first space-based component, the ancillary extraterrestrial component, the second space-based component, and the ancillary terrestrial component may be configured to relay communications between a radioterminal on the extraterrestrial body and a radioterminal on earth. Moreover, communications between the radioterminal on the extraterrestrial body and the radioterminal on earth may be relayed through at least two of the first space-based component, the ancillary extraterrestrial component, the second space-based component, and/or the ancillary terrestrial component.

The first space-based component may be configured to provide wireless communications over a first satellite frequency band, and the ancillary extraterrestrial component may be configured to reuse at least one satellite frequency of the first satellite frequency band. In addition, the second space-based component may be configured to provide wireless communications over a second satellite frequency band and the ancillary terrestrial component may be configured to reuse at least one satellite frequency of the second satellite frequency band. Moreover, the first and second satellite frequency bands may be substantially the same satellite frequency band.

The first space-based component may be configured to relay communications between first and second radioterminals on the extraterrestrial body, and the ancillary extraterrestrial component may be configured to relay communications between first and second radioterminals on the extraterrestrial body.

In addition, the first space-based component and the ancillary extraterrestrial component may be configured to relay communications between first and second radioterminals on the extraterrestrial body such that communications between the first and second radioterminals are relayed through both the ancillary extraterrestrial component and the first space-based component. The radioterminals located on earth and/or on the extraterrestrial body may be mobile radio terminals configured to provide full duplex voice communications, and/or to provide digital data communications.

The ancillary extraterrestrial component may be one of a plurality of ancillary extraterrestrial components on the extraterrestrial body with each ancillary extraterrestrial component defining a respective coverage area on the extraterrestrial body. More particularly, the first space-based component may be configured to provide wireless communications over a first satellite frequency band, the ancillary extraterrestrial component may be configured to reuse one or more of the satellite frequencies of the first satellite frequency band, and the one or more frequencies may be shared among the plurality of ancillary extraterrestrial components according to a reuse pattern to reduce interference between the extraterrestrial components.

The ancillary extraterrestrial component on the extraterrestrial body and the ancillary terrestrial component on earth may be configured to relay communications between a radioterminal on earth and a radioterminal on the extraterrestrial body. More particularly, communications between the radioterminal on earth and the radioterminal on the extraterrestrial body may be relayed through both the ancillary extraterrestrial component and the ancillary terrestrial component. The first space-based component and the second space-based component may be configured to relay communications between a radioterminal on earth and a radioterminal on the extraterrestrial body. More particularly, communications between the radioterminal on earth and the radioterminal on the extraterrestrial body may be relayed through the first space-based component and/or the second space-based component.

The first space-based component and the ancillary terrestrial component may be configured to relay communications between a radioterminal on earth and a radioterminal on the extraterrestrial body. More particularly, communications between the radioterminal on earth and the radioterminal on the extraterrestrial body may be relayed through both the first space-based component and the ancillary terrestrial component. The ancillary extraterrestrial component and the second space-based component may be configured to relay communications between a radioterminal on earth and a radioterminal on the extraterrestrial body. More particularly, communications between the radioterminal on earth and the radioterminal on the extraterrestrial body may be relayed through both the ancillary extraterrestrial component and the second space-based component.

According to third embodiments of the present invention, a communications system may include a space-based component having at least one satellite orbiting earth and an ancillary terrestrial component on earth. The space-based component may be configured to provide wireless communications with a plurality of radioterminals located on earth over a satellite frequency band. The ancillary terrestrial component may be configured to provide wireless communications with the plurality of radioterminals located on earth. Moreover, the ancillary terrestrial component may reuse at least one satellite frequency of the satellite frequency band, and the space-based component and the ancillary terrestrial component may be configured to relay communications therebetween. In addition, at least one of the space-based component and/or the ancillary terrestrial component may be configured to relay communications between one of the plurality of radioterminals located on earth and a radioterminal located on an extraterrestrial body.

The communications system may also include a second space-based component that is configured to provide wireless communications with a plurality of radioterminals located on the extraterrestrial body over a second satellite frequency band. More particularly, the second space-based component may include at least one satellite orbiting the extraterrestrial body, and the first space-based component, the second space-based component, and the ancillary terrestrial component may be configured to relay communications therebetween. In addition, an ancillary extraterrestrial component on the extraterrestrial body may be configured to provide wireless communications with the plurality of radioterminals located on the extraterrestrial body. Moreover, the ancillary extraterrestrial component may reuse at least one satellite frequency of the second satellite frequency band, and the second space-based component and the ancillary extraterrestrial component may be configured to relay communications therebetween. The first satellite frequency band and the second satellite frequency band may also be substantially the same satellite frequency band.

According to fourth embodiments of the present invention, methods may be provided for operating a communications system including a space-based component having at least one satellite orbiting an extraterrestrial body and an ancillary extraterrestrial component on the extraterrestrial body. Wireless communications may be provided from the space-based component with a plurality of radioterminals located on the extraterrestrial body over a satellite frequency band. Wireless communications may also be provided from the ancillary extraterrestrial component with the plurality of radioterminals located on the extraterrestrial body, and the ancillary extraterrestrial component may reuse at least one satellite frequency of the satellite frequency band. In addition, communications may be relayed between the space-based component and the ancillary extraterrestrial component.

According to fifth embodiments of the present invention, methods may be provided for operating a communications system including a first space-based component having at least one satellite orbiting an extraterrestrial body, an ancillary extraterrestrial component on the extraterrestrial body, a second space-based component having at least one satellite orbiting earth, and an ancillary terrestrial component on earth. Wireless communications may be provided from the first space-based component with a plurality of radioterminals located on the extraterrestrial body, and wireless communications may be provided from the ancillary extraterrestrial component with the plurality of radioterminals located on the extraterrestrial body. Communications may also be relayed between the first space-based component and the ancillary extraterrestrial component. Wireless communications may be provided form the second space-based component with a plurality of radioterminals located on earth, and wireless communications may be provided form the ancillary terrestrial component with the plurality of radioterminals located on earth. Communications may also be relayed between the second space-based component and the ancillary terrestrial component. Communications may also be relayed between a radioterminal on the extraterrestrial body and a radioterminal on earth. More particularly, communications between the radioterminal on the extraterrestrial body and the radioterminal on earth may be relayed through at least two of the first space-based component, the ancillary extraterrestrial component, the second space-based component, and/or the ancillary terrestrial component.

According to sixth embodiments of the present invention, methods may be provided for operating a communications system including a space-based component including at least one satellite orbiting earth, and an ancillary terrestrial component on earth. Wireless communications may be provided from the space-based component with a plurality of radioterminals located on earth over a satellite frequency band, and wireless communications may be provided from the ancillary terrestrial component with the plurality of radioterminals located on earth. More particularly, the ancillary terrestrial component may reuse at least one satellite frequency of the satellite frequency band. Communications may be relayed between the space-based component and the ancillary terrestrial component. In addition, communications may be relayed between one of the plurality of radioterminals located on earth and a radioterminal located on an extraterrestrial body using at least one of the space-based component and/or the extraterrestrial component.

DETAILED DESCRIPTION

The present invention now will be described more fully hereinafter with reference to the accompanying drawings, in which typical embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first and second are used herein to describe various elements, these elements should not be limited by these terms. These terms are only used to distinguish one element from another element. Thus, a first element below could be termed a second element, and similarly, a second element may be termed a first element without departing from the teachings of the present invention. As used herein, the term "and/or" includes any and all combinations of one or more of the associated listed items. Moreover, as used herein, "substantially the same" band means that the bands substantially overlap, but that there may be some areas of non-overlap, for example at the band ends. Moreover, "substantially the same" air interface means that the air interfaces are similar but need not be identical. Some changes may be made to the air interface to account for different characteristics for the terrestrial, extraterrestrial, and/or satellite environments.

Figure 1:
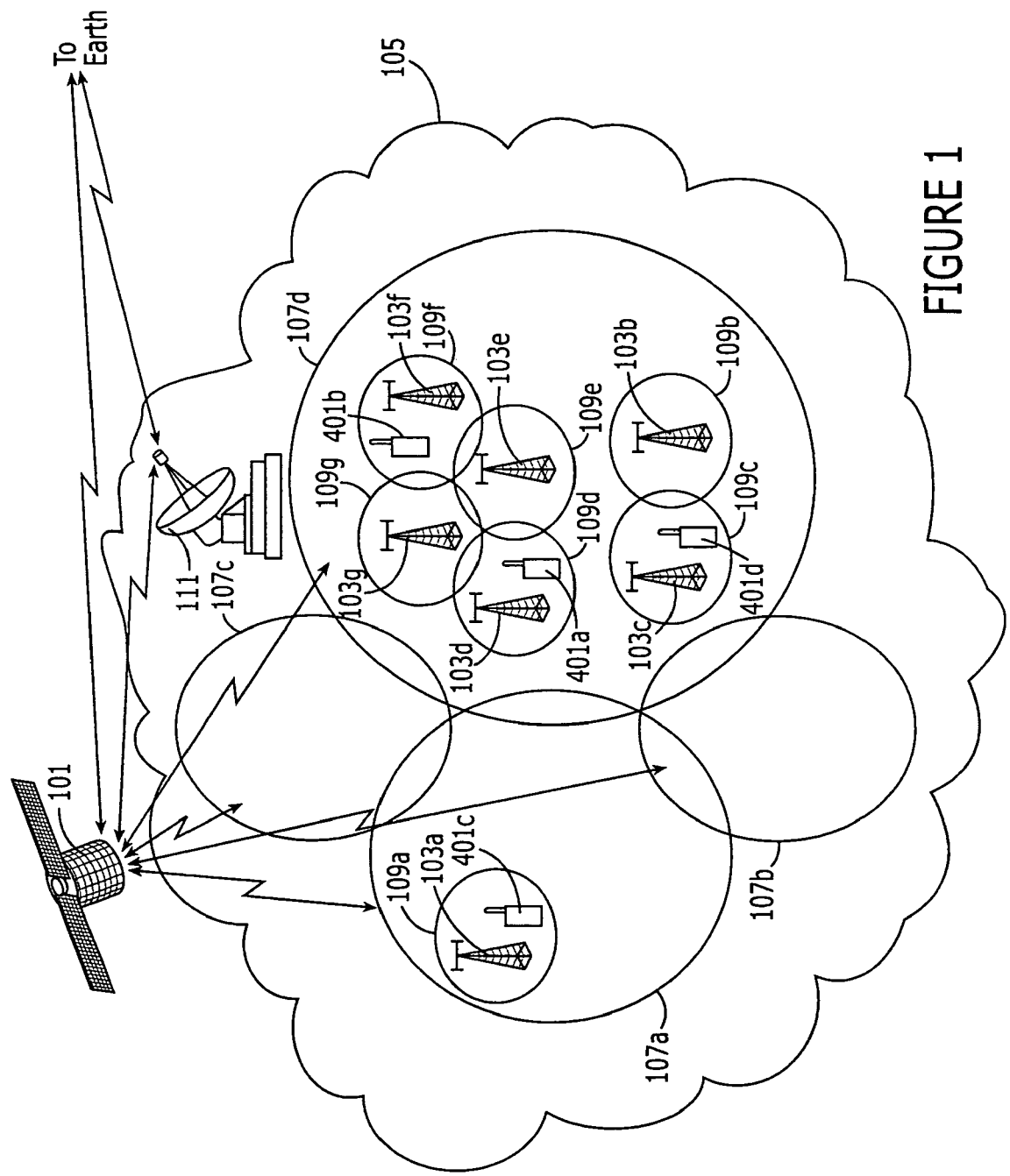
FIG. 1 is a schematic diagram of extraterrestrial communications systems and methods according to embodiments of the invention.

According to embodiments of the present invention illustrated in FIG. 1, communications systems and methods may be provided for an extraterrestrial body such as the Moon, Mars, or another planet or moon thereof. More particularly, a communications system may comprise a space-based network including at least one space-based component such as a satellite 101 orbiting the extraterrestrial body 105, and an ancillary extraterrestrial network including one or a plurality of ancillary extraterrestrial components 103a-g on the extraterrestrial body 105. While the space-based network is illustrated with a single satellite 101, the space-based network may include a plurality of satellites and each satellite may provide communications over different coverage areas 107a-d of the extraterrestrial body 105. While the ancillary extraterrestrial network is illustrated with a plurality of ancillary components 103a-g, ancillary extraterrestrial networks according to embodiments of the present invention may operate with only a single ancillary extraterrestrial component. As shown in FIG. 1, only a portion of the extraterrestrial body 105 is illustrated.

More particularly, the space-based network is configured to provide wireless communications with a plurality of radioterminals on the extraterrestrial body using a satellite frequency band. As shown in FIG. 1, the space-based network may define a plurality of non-overlapping, partially overlapping, and/or substantially overlapping satellite coverage areas 107a-d on the extraterrestrial body 105 using respective spot beams. One or more satellite frequencies of the satellite frequency band may be used to provide communications with each of the coverage areas 107a-d, and a satellite frequency reuse pattern may be established so that the same satellite frequencies may not be used in adjacent/overlapping ones of coverage areas 107a-d. While a single satellite 101 is shown in FIG. 1 providing communications in four coverage areas 107a-d, a space-based network according to embodiments of the present invention may include a plurality of satellites with each satellite providing service for one or a plurality of coverage areas.

Moreover, a satellite 101 or satellites of the space-based network may be relatively stationary (i.e. extraterrestrial-body-stationery) with respect to particular locations on the extraterrestrial body so that one or more coverage areas 107a-d thereof are relatively stationary with respect to the extraterrestrial body. Accordingly, a single satellite may provide continuous coverage for a relatively stationary coverage area. An orbit for a extraterrestrial-body-stationary satellite, however, may be relatively high. In addition or in an alternative, a satellite or satellites of the space-based network may be provided in a relatively low orbit to reduce transmission delays and/or to reduce a transmission power. With a relatively low orbit satellite, however, a radioterminal on the extraterrestrial body may not have continuous coverage from a single low orbit satellite. For example, a space-based network may include a plurality of relatively low orbit satellites with each satellite providing coverage for a particular location on the extraterrestrial body at a different time.

Accordingly, the space-based network of the communications system is configured to relay communications between first and second radioterminals on the extraterrestrial body 105 using at least one frequency of the satellite frequency band. For example, communications between two radioterminals located in the coverage area 107b may be relayed through the satellite 101 using a first communications channel between the first radioterminal and the satellite 101 and using a second communications channel between the second radioterminal and the satellite 101. Because the two radioterminals are in the same coverage area 107b, the first and second communications channels may be provided on different satellite frequencies of the satellite frequency band in a FDM/FDMA architecture; the first and second communications channels may be provided on the same satellite frequency using different time slots in a TDM/TDMA architecture; and/or the first and second communications channels may be provided on the same satellite frequency using different spread-spectrum codes in a CDM/CDMA (frequency-hopped and/or direct-sequence spread) architecture. Other architectures and/or air interface protocols may also be used. The space-based network of the communications system may also be configured to relay communications between radioterminals located in different coverage areas, such as coverage areas 107b and 107c.

Accordingly, the space-based network may provide for communications over relatively large portions of the extraterrestrial landscape. Communications between two radioterminals located in the same or different coverage areas 107a-d may be relayed through the space-based network. While a space-based network with a single satellite 101 is shown in FIG. 1, multiple satellites may be included in the space-based network. For example, communications may be relayed between a first radioterminal in coverage area 107b and a second radioterminal in coverage area 107c through a first satellite providing service for coverage area 107b and a second satellite providing service for coverage area 107c. A communications path between two radioterminals may thus pass through two or more satellites.

Each of the ancillary extraterrestrial components 103a-g of the ancillary extraterrestrial network defines a respective coverage area 109a-g. Each of the ancillary extraterrestrial components 103a-g may be configured to provide wireless communications with a plurality of radioterminals located on the extraterrestrial body. More particularly, each of the ancillary extraterrestrial components 103a-g is configured to reuse at least one satellite frequency of the satellite frequency band, and each of the ancillary extraterrestrial components 103a-g and the space-based component(s) such as satellite 101 are configured to relay communications therebetween. Coverage areas are shown as circles for purposes of illustration. Coverage areas, however, may have other shapes such as hexagonal, octagonal, wedge shaped, triangular, oval, substantially circular, etc.

Moreover, a plurality of adjacent ancillary extraterrestrial components 103d-g may have overlapping coverage areas 109d-g, and each of the ancillary extraterrestrial components 103d-g may reuse one or more satellite frequencies of the satellite frequency band. As discussed above, the space-based component such as satellite 101 may provide wireless communications with the coverage area 107d using one or more satellite frequencies of the satellite frequency band with different satellite frequencies being used by the space-based component such as satellite 101 to provide wireless communications over the coverage areas 107b-c. Accordingly, the ancillary extraterrestrial components 103d-g may reuse satellite frequencies other than satellite frequencies used by the satellite 101 to provide wireless communications with the coverage area 107d. Accordingly, interference between the ancillary extraterrestrial components 103d-g and the space-based network can be reduced.

In addition, a plurality of satellite frequencies may be shared among the ancillary extraterrestrial components 103d-g according to a frequency reuse pattern to reduce interference between adjacent ancillary extraterrestrial components 103d-g. Reuse of satellite frequencies among the adjacent ancillary extraterrestrial components 103d-g may be provided, for example, such that adjacent ancillary extraterrestrial components do not reuse the same frequencies at the same time. For example, ancillary extraterrestrial components 103e-g have overlapping coverage areas 109e-g so that the same satellite frequencies may not be reused at the same time by any of the ancillary extraterrestrial components 103e-g in a FDM/FDMA and/or TDM/TDMA architecture and/or air interface protocol. However, for certain architectures and/or air interface protocols, such as a CDM/CDMA architecture and/or air interface protocol, the ancillary extraterrestrial components 103e-g may reuse at the same time the same satellite band frequency or frequencies. Ancillary extraterrestrial components 103d and 103f have non-overlapping coverage areas 109d and 109f, and the same satellite frequencies may thus be reused by ancillary extraterrestrial components 103*d* and 103*f* at the same time. Moreover, satellite frequencies used by ancillary extraterrestrial components 103*d-g* may be used at the same time by a space-based component such as satellite 101 for communications with coverage areas 107*a*, 107*b*, and/or 107*c*.

Similarly, ancillary extraterrestrial components 103*b-c* may define overlapping coverage areas 109*b-c*, and ancillary extraterrestrial components 103*b-c* may use different satellite frequencies to reduced interference therebetween. Moreover, satellite frequencies used by ancillary extraterrestrial components 103*b-c* may be different than satellite frequencies used by the space-based component for communications in the coverage area 107*d*. Satellite frequencies used by the ancillary extraterrestrial components 103*b-c*, however, may be reused by a space-based component such as satellite 101 for communications in coverage areas 107*a*, 107*b*, and/or 107*c*. In addition, ancillary extraterrestrial component 103*a* may define coverage area 109*a*, and ancillary extraterrestrial communication component 103*a* may use satellite frequencies different than those used by a space-based component such as satellite 101 for communications in the coverage area 107*a*. Satellite frequencies used by the ancillary extraterrestrial component 103*a*, however, may be reused by the space-based component for communications in coverage areas 107*b*, 107*c*, and/or 107*d*.

A single ancillary extraterrestrial component (such as 103*g*), for example, may relay communications between two radioterminals located in the respective coverage area (such as 109*g*). Moreover, ancillary extraterrestrial components 103*d-g* may be networked such that communications between a first radioterminal in coverage area 109*d* and a second radioterminal in coverage area 109*f* are relayed through respective ancillary extraterrestrial components 103*d* and 103*f*. Links between ancillary extraterrestrial components 103*d-g* may be provided, for example, by wire link, by optic fiber link, by radio link, and/or by satellite link. Moreover, service for a radioterminal may be switched during communications from one ancillary extraterrestrial component to another as the radioterminal moves from the coverage area of one ancillary extraterrestrial component to another. Switching, for example, may be controlled from a switching office, the functionality of which may be distributed among different ancillary extraterrestrial components, provided at one of the ancillary extraterrestrial components, provided separate from any of the ancillary extraterrestrial components, and/or provided at one or more space-based components of the space-based network.

Similarly, ancillary extraterrestrial components 103*a-c* may provide wireless communications for radioterminals located in coverage areas 109*a-c*. For example, ancillary extraterrestrial component 103*a* may relay communications between two radioterminals located in coverage area 109*a*, ancillary extraterrestrial component 103*b* may relay communications between two radioterminals located in coverage area 109*b*, and ancillary extraterrestrial component 103*c* may relay communications between two radioterminals located in coverage area 109*c*. Moreover, links between all of the ancillary extraterrestrial components 103*a-g* may be provided, for example, by wire link, by optic fiber link, by radio link, and/or by satellite link. Communications between a radioterminal in coverage area 109*a* and a radioterminal in coverage area 109*c*, for example, may be relayed through ancillary extraterrestrial components 103*a* and 103*c*.

Coverage for a radioterminal on the extraterrestrial body may thus be provided by either the space-based network (including one or more space based components such as satellite 101) or the ancillary extraterrestrial network (including one or more ancillary extraterrestrial components 103*a-g*). More particularly, one or more ancillary extraterrestrial components may be provided at locations on the extraterrestrial body where a relatively high volume of radioterminal usage is expected, and coverage from the space-based network may be provided over larger areas to cover areas not covered by the ancillary extraterrestrial components 103*a-g*.

A space-based component such as satellite 101 may thus provide communications for radioterminals located in relatively large coverage areas 107*a-d* while the ancillary extraterrestrial components 103*a-g* may provide communications for radioterminals located in relatively small coverage areas 109*a-g*. Moreover, the satellite(s) 101 of the space-based network and the ancillary extraterrestrial components 103*a-g* of the ancillary extraterrestrial network may be networked so that communications can be relayed therebetween.

When a radioterminal is in a coverage area of an ancillary extraterrestrial component, the radioterminal may elect to establish a link with the available ancillary extraterrestrial component instead of the space-based component to conserve power, to reduce propagation delays, and/or to enhance system efficiency and/or capacity. Because the ancillary extraterrestrial component is on the extraterrestrial body and may cover a relatively limited area thereof, the radioterminal can transmit to the ancillary extraterrestrial component at a lower power than may be required to transmit to the space-based component. Moreover, a propagation delay in communications may be reduced if all of the links in a communication can be maintained within one or more ancillary extraterrestrial components. When a radioterminal is outside a coverage area of the ancillary extraterrestrial components, a link may be established with a space-based component such as satellite 101. In addition, use of relatively small coverage areas in the ancillary extraterrestrial network may allow a relatively high degree of frequency reuse and a greater density of radioterminal usage.

A first radioterminal 401*a*, for example, may initially be located in coverage area 109*d* when a communication is first established with a second radioterminal 401*b* located in coverage area 109*f*. Accordingly, communications may be initially relayed between the radioterminals through ancillary extraterrestrial components 103*d* and 103*f*. If the first radioterminal moves to coverage area 109*g*, coverage of the first radioterminal may be handed off from the ancillary extraterrestrial component 103*d* to ancillary extraterrestrial component 103*g* so that communications are relayed between the radioterminals through ancillary extraterrestrial components 103*g* and 103*f*. If the first radioterminal then moves outside any of the coverage areas 103*d-g*, coverage of the first radioterminal may be handed off to a portion of the space-based network such as satellite 101 providing coverage for coverage area 107*d*. Accordingly, communications may be relayed between the radioterminals through the satellite 101 and the ancillary extraterrestrial component 103*f*. A communication such as a radiotelephone conversation may thus be maintained as one or both radioterminals move between coverage areas 103*a-g* and/or coverage areas 107*a-d*.

According to another example, a first radioterminal 401*c* may be located in coverage area 109*a*, and a second radioterminal 401*d* may be located in coverage area 109*c*, and a link between ancillary extraterrestrial components 103*a* and 103*c* may be provided via satellite 101. Communications may thus be relayed between the first and second radioterminals 401*c-d* through the ancillary extraterrestrial component 103*a*, the satellite 101, and the ancillary component 103*c*. While a propagation delay may be introduced through the satellite link, the use of the ancillary extraterrestrial components 103*a* and 103c may reduce a transmission power required from the radioterminals to thereby extend battery life thereof. Stated in other words, even though the communications are transmitted through the satellite, the introduction of an ancillary extraterrestrial component into the communications link may reduce power consumption (and/or increase battery life) at the radioterminal(s). If the first radioterminal 401c moves outside the coverage area 109a, communications may be relayed between the first and second radioterminals 401c-d through the satellite 101 and the ancillary extraterrestrial component 103c.

According to particular embodiments of the present invention, a radioterminal on the extraterrestrial body may initially seek service from an ancillary extraterrestrial component on the extraterrestrial body so that the radioterminal may transmit at a lower power than may otherwise be required to transmit to a space-based component such as a satellite. Even if a particular communication will require a link through a satellite, an ancillary extraterrestrial component may provide the link to the satellite more efficiently than the radioterminal alone because an ancillary extraterrestrial component may be less constrained in size than a radioterminal, and an ancillary extraterrestrial component may have a greater power capacity. If an ancillary extraterrestrial component is not available, the radioterminal may seek service directly from a space-based component such as satellite 101.

The ancillary extraterrestrial components 103a-g may be specially adapted for operation in an extraterrestrial environment. Each ancillary extraterrestrial component may be self-contained, for example, including a power supply such as one or more of a solar cell, a battery, and/or a fuel cell. Moreover, each ancillary extraterrestrial component may include one (or more) transceiver(s) to provide one (or more) communications link(s) with one or more satellites of the space-based component, one (or more) transceiver(s) to provide one (or more) communications link(s) with one (or more) radioterminal(s), and/or one (or more) transceiver(s) to provide one (or more) communications link(s) with one (or more) other ancillary extraterrestrial component(s). In addition, each ancillary extraterrestrial component may be configured to be deployed from space with little or no manual assembly required once the ancillary extraterrestrial component lands on the extraterrestrial body.

Each ancillary extraterrestrial component may also be configured to automatically scan for the presence of other nearby ancillary extraterrestrial components to create an adaptable ancillary extraterrestrial network. For example, if two ancillary extraterrestrial components land near one another on the extraterrestrial body, one component may detect transmissions of the other and initiate a link therebetween. The link between the two components may then be used to coordinate frequency reuse between the two components, transmission powers of the two components, hand-offs of radioterminals between the two ancillary extraterrestrial components, and/or links with a space-based component (such as a satellite). Each ancillary extraterrestrial component may also be configured to automatically scan for the presence of a space-based component such as a satellite.

For example, the ancillary extraterrestrial component may detect transmissions from a space-based component (such as a satellite) to a coverage area in which the ancillary extraterrestrial component is located and initiate a link therebetween. The link may be used to coordinate frequency reuse, hand-offs of radioterminals between the ancillary extraterrestrial component and the space-based component, and/or links through the satellite to other ancillary extraterrestrial components and/or radioterminals.

Because both the space-based component(s) and the ancillary extraterrestrial component(s) operate using satellite frequencies, a radioterminal according to embodiments of the present invention may communicate through both space-based and ancillary extraterrestrial components using substantially a same transceiver and/or substantially a same communications protocol. A number of components and/or size of the radioterminal can thus be reduced. Moreover, a radioterminal according to embodiments of the present invention may be incorporated into a space suit used to provide life-support on the extraterrestrial body. In other embodiments, the radioterminal may be a hand-held device.

According to additional embodiments of the present invention illustrated in FIG. 1, communications may be relayed between a radioterminal(s) on the extraterrestrial body and communications systems on earth through a space-based component such as satellite 101 and/or through a relay station(s) 111 (also referred to as a gateway) on the extraterrestrial body. For example, a communication may be established between a radioterminal in coverage area 109a and a radioterminal on earth with links being provided through the ancillary extraterrestrial component 103a, the satellite 101, and a communications system on earth (such as will be described with respect to FIG. 2). In another example, a communication may be established with links being provided through the ancillary extraterrestrial component 103a, the satellite 101, the relay station 111, and a communications system on earth. In yet another example, a communication may be established with links being provided through the ancillary extraterrestrial component 103a, the relay station 111 (without a link through a satellite orbiting the extraterrestrial body), and a communications system on earth.

In other examples, a radioterminal may be outside any coverage areas provided by ancillary extraterrestrial components. For example, a communication may be established between a radioterminal in coverage area 107b and a radioterminal on earth with links being provided through the satellite 101 and a communications system on earth. In another example, a communication may be established with links being provided through the satellite 101, the relay station 111, and a communications system on earth. Moreover, service for a radioterminal may be handed-off from one ancillary extraterrestrial component to another, from an ancillary extraterrestrial component to a space-based component, and/or from one space-based component coverage area to another during a communication with a radioterminal on earth.

The relay station 111 may be optional with links to earth being provided through a space-based component such as a satellite. Moreover, a space-based network may include a plurality of satellites in orbit around the extraterrestrial body to provide that at least one satellite is always in alignment for communication with earth. In another alternative, links to earth may be provided through one or more of the ancillary extraterrestrial components without requiring a separate relay station. Stated in other words, one or more of the ancillary extraterrestrial components may include functionality of a relay station therein.

If a separate relay station 111 is included, links between the relay station 111 and one or more of the ancillary extraterrestrial components may be provided, for example, by wire link, by optic fiber link, by radio link, and/or by satellite link. Moreover, a plurality of relay stations 111 may be provided around the extraterrestrial body to provide that at least one relay station 111 is always in alignment for communication with earth. For example, three relay stations could be provided at approximately 120 degree intervals around the extraterrestrial body.

Figure 2:
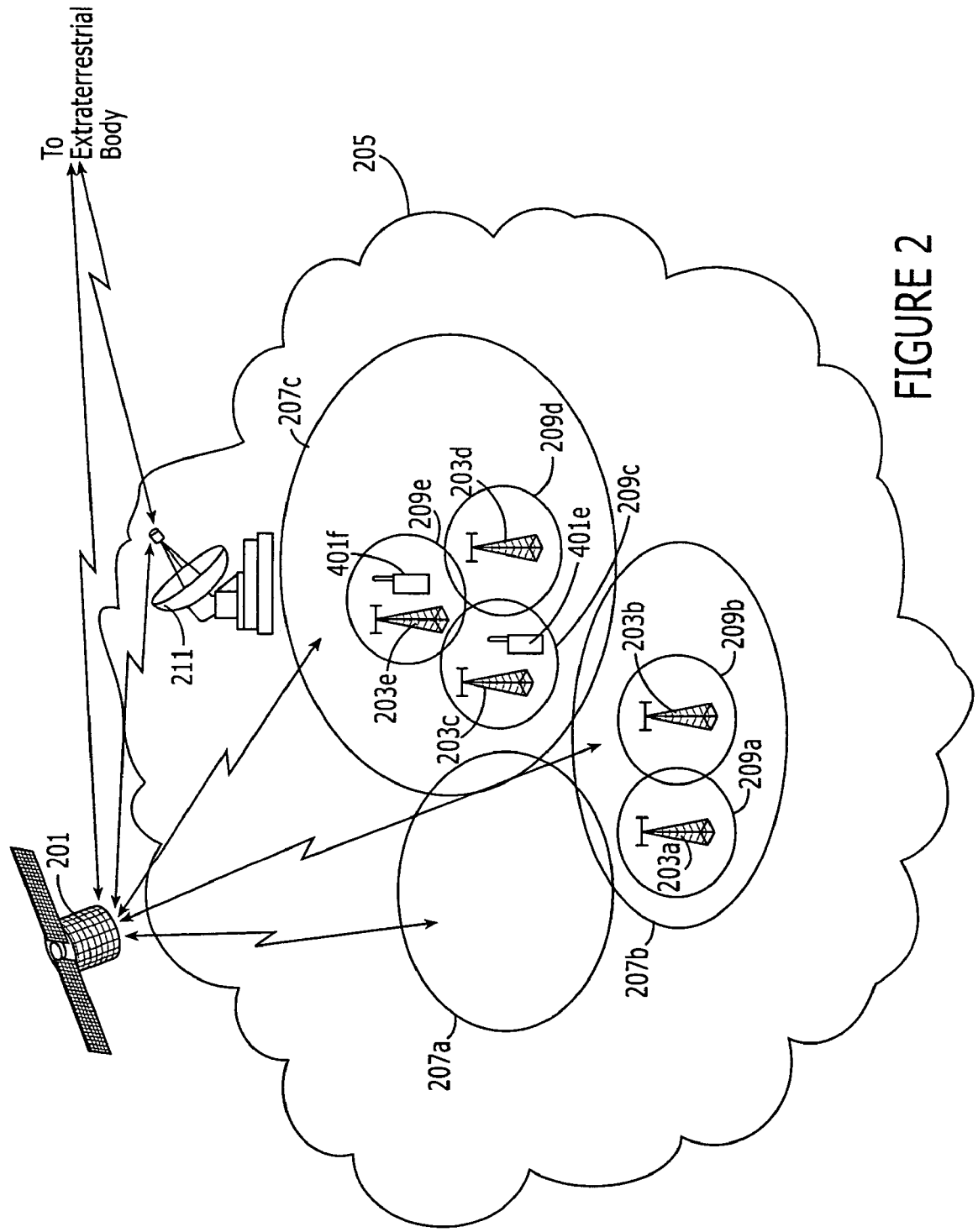
FIG. 2 is a schematic diagram of communications systems and methods on earth according to embodiments of the present invention.

According to additional embodiments of the present invention illustrated in FIG. 2, communications systems and methods may be provided for use on earth. As shown in FIG. 2, a second space-based network may include at least one space-based component such as a satellite 201 orbiting earth 205, and an ancillary terrestrial network including one or a plurality of ancillary terrestrial components 203a-e on earth 205. While the second space-based network is illustrated with a single satellite 201, the space-based network may include a plurality of satellites, and each satellite may provide communications over different coverage areas 207a-c on earth. While a plurality of ancillary terrestrial components 203a-e are illustrated, ancillary terrestrial networks according to embodiments of the present invention may operate with only a single ancillary terrestrial component. As shown in FIG. 2, only a portion of earth 205 is illustrated.

Terrestrial communications systems including space-based and ancillary terrestrial components used to provide communications for radioterminals are discussed, for example, in the following U.S. patents and U.S. patent publications. Satellite radioterminal communications systems and methods that may employ terrestrial reuse of satellite frequencies are described, for example, in U.S. Pat. No. 6,684,057 to Karabinis, entitled Systems and Methods for Terrestrial Reuse of Cellular Satellite Frequency Spectrum; and Published U.S. Patent Application Nos. U.S. 2003/0054760 to Karabinis, entitled Systems and Methods for Terrestrial Reuse of Cellular Satellite Frequency Spectrum; U.S. 2003/0054761 to Karabinis, entitled Spatial Guardbands for Terrestrial Reuse of Satellite Frequencies; U.S. 2003/0054814 to Karabinis et al., entitled Systems and Methods for Monitoring Terrestrially Reused Satellite Frequencies to Reduce Potential Interference; U.S. 2003/0073436 to Karabinis et al., entitled Additional Systems and Methods for Monitoring Terrestrially Reused Satellite Frequencies to Reduce Potential Interference; U.S. 2003/0054762 to Karabinis, entitled Multi-Band/Multi-Mode Satellite Radiotelephone Communications Systems and Methods; U.S. 2003/0153267 to Karabinis, entitled Wireless Communications Systems and Methods Using Satellite-Linked Remote Terminal Interface Subsystems; U.S. 2003/0224785 to Karabinis, entitled Systems and Methods for Reducing Satellite Feeder Link Bandwidth/Carriers In Cellular Satellite Systems; U.S. 2002/0041575 to Karabinis et al., entitled Coordinated Satellite-Terrestrial Frequency Reuse; U.S. 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; U.S. 2003/0068978 to Karabinis et al., entitled Space-Based Network Architectures for Satellite Radiotelephone Systems; U.S. 2003/0143949 to Karabinis, entitled Filters for Combined Radiotelephone/GPS Terminals; U.S. 2003/0153308 to Karabinis, entitled Staggered Sectorization for Terrestrial Reuse of Satellite Frequencies; and U.S. 2003/0054815 to Karabinis, entitled Methods and Systems for Modifying Satellite Antenna Cell Patterns In Response to Terrestrial Reuse of Satellite Frequencies. All of the above referenced patents and patent publications are assigned to the assignee of the present invention, and the disclosures of all of these patents and patent publications are hereby incorporated herein by reference in their entirety as if set forth fully herein.

Accordingly, the second space-based network including satellite 201 may provide communications for radioterminals located in coverage areas 207a-c using a satellite frequency band. According to particular embodiments of the present invention, substantially the same satellite frequency band may be used by both the first space-based network including satellite 101 orbiting the extraterrestrial body and the second space-based network including satellite 201 orbiting earth. Accordingly, a same radioterminal may operate on both earth and the extraterrestrial body without requiring multi-mode operation. For example, substantially the same satellite frequency band used by both the first and second space-based networks may include frequencies in the range of approximately 1626.5 MHz to approximately 1660.5 MHz and/or frequencies in the range of approximately 1525 MHz to approximately 1559 MHz. More particularly, a forward link for transmissions from the space-based networks may be provided by frequencies in the range of approximately 1525 MHz to approximately 1559 MHz, and a return link for transmissions to the space-based networks may be provided by frequencies in the range of approximately 1626.5 MHz to approximately 1660.5 MHz. In an alternative, different satellite frequency bands may be used by a space-based network including one or more satellites orbiting the extraterrestrial body and by the space-based network including one or more satellites orbiting earth.

More particularly, a satellite frequency reuse pattern may be established so that the same satellite frequencies are not used in adjacent/overlapping ones of the coverage areas 207a-c at the same time. Accordingly, the space-based network of the communications system is configured to relay communications between first and second radioterminals on earth using at least one frequency of the satellite frequency band. For example, communications between two radioterminals located in the coverage area are 207b may be relayed through satellite 201 using a first communications channel between the first radioterminal and the satellite 201 and using a second communications channel between the second radioterminal and the satellite 201. Because the two terminals are in the same coverage area, the first and second communications channels may be provided on different satellite frequencies of the satellite frequency band; the first and second communications channels may be provided on the same satellite frequency using different time slots in a TDM/TDMA architecture and/or air interface protocol; and/or the first and second communications channels may be provided on the same satellite frequency using different codes in a CDM/CDMA architecture and/or air interface protocol. The space-based network may also be configured to relay communications between radioterminals located in different coverage areas, such as coverage areas 207a and 207b.

Accordingly, the space-based network including satellite 201 may provide for communications over relatively large portions of earth. Communications between two radioterminals located in the same or different coverage areas 207a-c may be relayed through the space-based component. While a space-based network with a single satellite 201 is shown in FIG. 2, multiple satellites may be included in the space-based network. For example, communications may be relayed between a first radioterminal in coverage area 207b and a second radioterminal in coverage area 207c through a first satellite providing service for coverage area 207b and a second satellite providing service for coverage area 207c. A communications path between two radioterminals may thus pass through two or more satellites.

Each of the ancillary terrestrial communications components 203a-e defines a respective coverage area 209a-e. Each of the ancillary terrestrial communications components 203a-e is configured to provide wireless communications with a plurality of radioterminals located within a coverage area thereof. More particularly, each of the ancillary terrestrial components 203a-e is configured to reuse at least one satellite frequency of the satellite frequency band, and each of the ancillary terrestrial components 203a-e and the space-based component(s) such as satellite 201 may be configured to relay communications therebetween.

Moreover, a plurality of adjacent ancillary terrestrial components 203c-e may have overlapping coverage areas 209c-e, and each of the ancillary terrestrial components 203c-e may reuse one or more satellite frequencies of the satellite frequency band. As discussed above, a space-based component such as satellite 201 may provide wireless communications for radioterminals in the coverage area 207c using one or more satellite frequencies of the satellite frequency band with different satellite frequencies being used by the space-based component to provide wireless communications over the coverage areas 207a-b. Accordingly, the ancillary terrestrial components 203c-e may reuse satellite frequencies other than the satellite frequencies used by the satellite 201 to provide wireless communications for radioterminals in the coverage area 207c. Accordingly, interference between ancillary terrestrial components 203c-e and the space-based network can be reduced.

In addition, a plurality of satellite frequencies may be shared among the ancillary terrestrial components 203c-e according to a frequency reuse pattern to reduce interference between adjacent ancillary terrestrial components 203c-e. Reuse of satellite frequencies among the adjacent ancillary terrestrial components 203c-e may be provided, for example, such that adjacent ancillary terrestrial components do not reuse the same frequencies at the same time. Ancillary terrestrial components 203a-b (and/or additional adjacent ancillary terrestrial components) may also share a plurality of satellite frequencies according to a frequency reuse pattern. Moreover, satellite frequencies used by ancillary terrestrial components 203c-e may be used at the same time by the satellite 201 for communications with radioterminals in coverage areas 207a-b. Similarly, satellite frequencies used by ancillary terrestrial components 203a-b may be used at the same time by the satellite 201 for communications with radioterminals in coverage areas 207a or 207c.

Communications for a radioterminal on earth may thus be provided by a space-based component such as satellite 201 within one of the coverage areas 207a-c and/or by an ancillary terrestrial component 203a-e within one of the coverage areas 209a-e. When within a coverage area 209a-e, a radioterminal may communicate through the respective ancillary terrestrial component 203a-e. When outside coverage areas 209a-e of the ancillary terrestrial components 203a-e or when an ancillary terrestrial component is not available, the radioterminal may communicate through a space-based component(s) (such as satellite 201) of the space-based network. Moreover, components of the space-based and ancillary terrestrial networks may be coupled with a public switched telephone network on earth. Accordingly, a radioterminal may establish communications through a space-based component and/or an ancillary terrestrial component with another radioterminal on earth. The other radioterminal may be coupled through the space-based network including the satellite 201 and the ancillary terrestrial components 203a-e or through another wireless network such as a cellular and/or PCS radiotelephone network. In another alternative, a radioterminal may establish communications through a space-based component or an ancillary terrestrial component with a conventional telephone through a public switched telephone network.

A single ancillary terrestrial component (such as 203e), for example, may relay communications between two radioterminals located in the respective coverage area (such as 209e). Moreover, ancillary terrestrial components 203c-e may be networked such that communications between a first radioterminal in coverage area 209c and a second radioterminal in coverage area 209e are relayed through respective ancillary terrestrial components 203c and 203e. Links between ancillary components 209c-e may be provided, for example, by wire link, by optic fiber link, by radio link, and/or by satellite link. Moreover, service for a radioterminal may be switched during communications from one ancillary terrestrial component to another as the radioterminal moves from the coverage area of one ancillary terrestrial component to another. Switching, for example, may be controlled from a switching office, the functionality of which may be distributed among different ancillary terrestrial components, provided at one of the ancillary terrestrial components, provided separate from any of the ancillary terrestrial components, and/or provided at one or more satellites of the space-based component.

Similarly, ancillary terrestrial components 203a-b may provide wireless communications for radioterminals located in coverage areas 209a-b. For example, ancillary terrestrial component 203a may relay communications between two radioterminals located in coverage area 209a, and ancillary terrestrial component 203b may relay communications between two radioterminals located in coverage area 209b. Moreover, links between all of the ancillary terrestrial components 203a-e may be provided, for example, by wire link, by optic fiber link, by radio link, and/or by satellite link. Communications between a radioterminal in coverage area 209a and a radioterminal in coverage area 209e, for example, may be relayed through ancillary terrestrial components 203a and 203e.

A space-based component such as satellite 201 may thus provide communications for radioterminals located in relatively large coverage areas 207a-c while the ancillary terrestrial components 203a-e may provide communications for radioterminals located in relatively small coverage areas 209a-e. Moreover, a satellite(s) 201 of the space-based network and ancillary terrestrial components 203a-e of the ancillary terrestrial network may be networked so that communications can be relayed therebetween.

According to a particular example, a first radioterminal 401e may initially be located in coverage area 209c when a communication is first established with a second radioterminal 401f in coverage area 209e. Accordingly, communications may be initially relayed between the radioterminals 401e-f through ancillary terrestrial components 203c and 203e. If the first radioterminal 401e moves to coverage area 209d, coverage of the first radioterminal 401e may be handed off from the ancillary terrestrial component 203c to ancillary terrestrial component 203d so that communications are relayed between the radioterminals 401e-f through ancillary terrestrial components 203d and 203e. If the first radioterminal 401e then moves outside of any of coverage areas 203c-e, coverage of the first radioterminal 401e may be handed off to a space-based component such as satellite 201 providing coverage for coverage area 207c. Accordingly, communications may be relayed between two radioterminals 401e-f through the satellite 201 and/or the ancillary terrestrial component 203e. A communication such as a radiotelephone communication may thus be maintained as one or both radioterminals move between coverage areas 203a-e and/or coverage areas 207a-c.

According to embodiments of the present invention illustrated in FIG. 2, communications may be relayed between a radioterminal(s) on earth and communications systems on an extraterrestrial body (such as illustrated in FIG. 1) through a satellite(s) 201 of the space-based network and/or through a relay station(s) 211 (also referred to as a gateway) on earth.

For example, a communication may be established between a radioterminal in coverage area 209a and a radioterminal on an extraterrestrial body with links being established through the ancillary terrestrial component 203a, the satellite 201, the relay station 211, and a communications network on the extraterrestrial body. In yet another example, a communication may be established with links being provided through the ancillary terrestrial component 203a, the relay station 211 (without a link through a satellite orbiting earth), and a communications network on the extraterrestrial body.

In other examples, a radioterminal may be outside any coverage areas provided by ancillary terrestrial components. For example, a communication may be established between a radioterminal in coverage area 207b and a radioterminal on the extraterrestrial body with links being provided through the satellite 201 and a communications network on the extraterrestrial body. In another example, a communication may be established with links being provided through the satellite 201, the relay station 211, and a communications network on the extraterrestrial body. Moreover, service for a radioterminal may be handed-off from one ancillary terrestrial component to another, from an ancillary terrestrial component to a space-based component, and/or from one space-based component coverage area to another during a communication with a radioterminal on the extraterrestrial body.

The relay station 211 may be optional with links to the extraterrestrial body being provided through a satellite of the space-based component. Moreover, the space-based component may include a plurality of satellites in orbit around earth to provide that at least one satellite is always in alignment for communication with the extraterrestrial body. In other alternatives, links to the extraterrestrial body may be provided through one or more of the ancillary terrestrial components without requiring a separate relay station. Stated in other words, one or more of the ancillary terrestrial components may include functionality of a relay station therein.

If a separate relay station 211 is included, links between the relay station 211 and one or more of the ancillary terrestrial components may be provided, for example, by wire link, by optic fiber link, by radio link, and/or by satellite link. Moreover, a plurality of relay stations 211 may be provided around earth to provide that at least one relay station 211 is always in alignment for communication with the extraterrestrial body. For example, three relay stations could be provided at approximately 120 degree intervals around earth.

Figure 3:
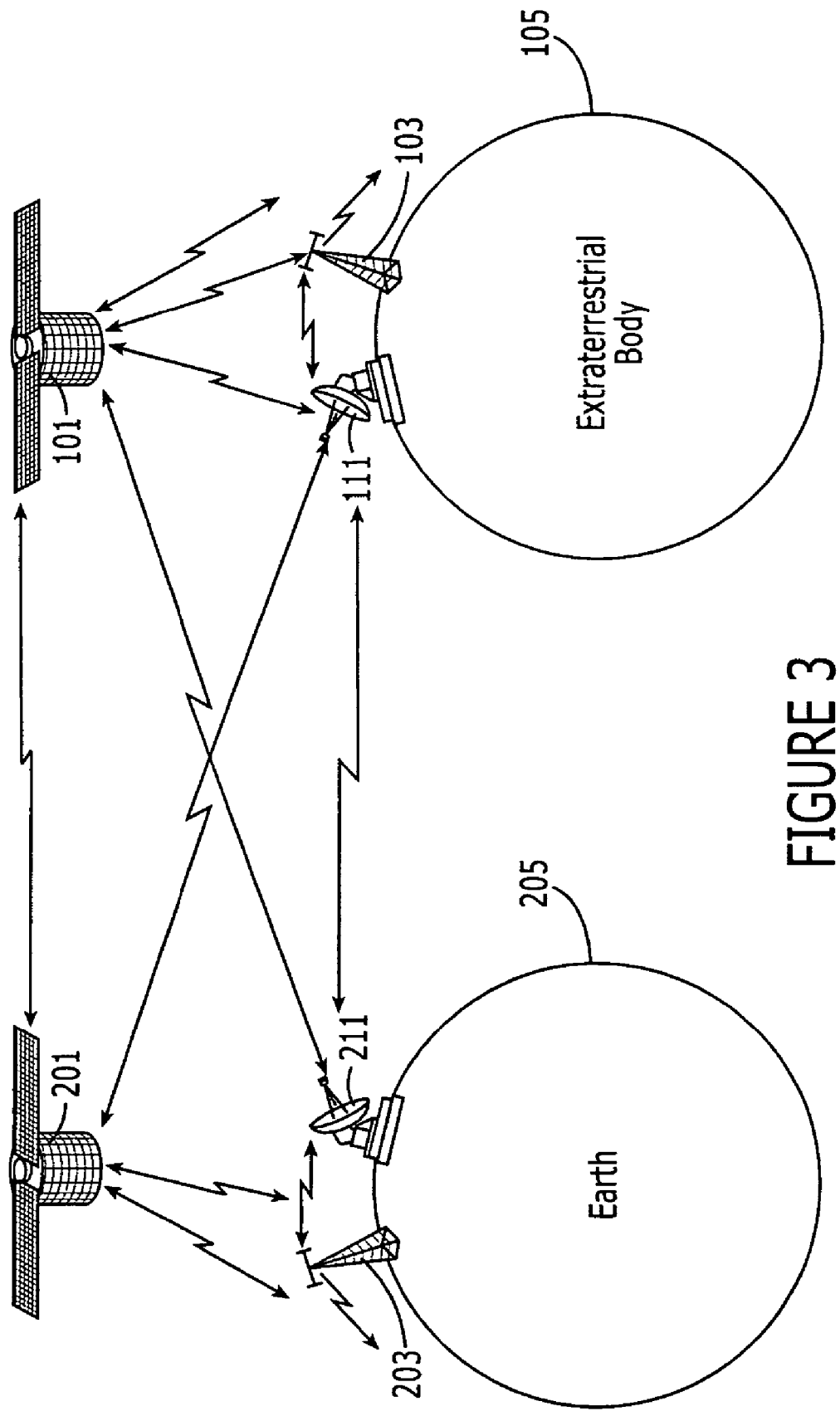
FIG. 3 is a schematic diagram of communications systems and methods on earth and on an extraterrestrial body according to embodiments of the present invention.

Communications systems and methods as discussed above with respect to FIGS. 1 and 2 can thus relay communications therebetween to support communications between radioterminals on earth and radioterminals on an extraterrestrial body as shown in FIG. 3. As discussed above, a plurality of ancillary terrestrial components may be included in the communications system on earth, and a plurality of ancillary extraterrestrial components may be included in the communications system on the extraterrestrial body as discussed above with respect to FIGS. 1 and 2. Moreover, a plurality of satellites may be included in the space-based components orbiting earth and/or the extraterrestrial body as discussed above with respect to FIGS. 1 and 2. A single ancillary terrestrial component 203 on earth, a single satellite 201 orbiting earth, a single ancillary extraterrestrial component 103 on the extraterrestrial body, and a single satellite 101 orbiting the extraterritorial body are shown in FIG. 3 for ease of illustration. It will be understood, however, that all elements discussed above with respect to FIGS. 1 and 2 may be implemented in systems and methods illustrated in FIG. 3.

As discussed above, the satellite 101 orbiting the extraterrestrial body may provide communications for radioterminals in one or more satellite coverage areas on the extraterrestrial body using one or more frequencies of a satellite frequency band. The ancillary extraterrestrial component 103 provides communications for radioterminals in an ancillary coverage area serviced by the ancillary extraterrestrial component 103 using one or more frequencies of the satellite frequency band. A radioterminal may thus obtain service from the ancillary extraterrestrial component 103 (or another ancillary extraterrestrial component) when within range of the ancillary extraterrestrial component. A radioterminal may obtain service from the satellite 101 when outside a range of any ancillary extraterrestrial components. A radioterminal may also obtain service from the satellite 101 when inside a range of any ancillary extraterrestrial component.

On the extraterrestrial body, communications between two radioterminals both within a coverage area of the ancillary extraterrestrial component 103 may be relayed between the two radioterminals through the ancillary extraterrestrial component 103 and/or through the satellite 101. Communications between two radioterminals both outside coverage areas of ancillary extraterrestrial components may be relayed between the two radioterminals through the satellite 101. Moreover, communications between a first radioterminal within a coverage area of the ancillary extraterrestrial component 103 and a second radioterminal outside coverage areas of any ancillary extraterrestrial components may be relayed between the two radioterminals through the ancillary extraterrestrial component 103 and the satellite 101 and/or through the satellite 101.

On earth, communications between two radioterminals both within a coverage area of the ancillary terrestrial component 203 may be relayed between the two radioterminals through the ancillary terrestrial component 203 and/or through the satellite 201. Communications between two radioterminals both outside coverage areas of ancillary terrestrial components may be relayed between the two radioterminals through the satellite 201. Moreover, communications between a first radioterminal within a coverage area of the ancillary terrestrial component 203 and a second radioterminal outside coverage areas of any ancillary terrestrial components may be relayed between the two radioterminals through the ancillary terrestrial component 203 and the satellite 201 and/or through the satellite 201.

In addition, the communications systems of FIG. 3 may support communications between a first radioterminal on earth and a second radioterminal on the extraterrestrial body. A first radioterminal may be within a coverage area of the ancillary terrestrial component 203 and a second radioterminal may be within a coverage area of the ancillary extraterrestrial component 103 and communications may be relayed therebetween. For example, communications between the first and second radioterminals may be relayed through the ancillary terrestrial component 203, the satellite 201, the satellite 101, and the ancillary extraterrestrial component 103. In an alternative, communications between the first and second radioterminals may be relayed through the ancillary terrestrial component 203, the relay station 211, the satellite 101, and the ancillary extraterrestrial component 103. In another alternative, communications between the first and second radioterminals may be relayed through the ancillary terrestrial component 203, the satellite 201, the relay station 111, and the ancillary extraterrestrial component 103. In yet another alternative, communications between the first and second radioterminals may be relayed through the ancillary terrestrial component 203, the relay station 211, the relay station 111, and the ancillary extraterrestrial component 103. In still another alternative, communications between the first and second radioterminals may be relayed through the ancillary terrestrial component 203, the satellite 201 and/or the relay station 211, the relay station 111, and/or the satellite 101, and the ancillary extraterrestrial component 103.

The first radioterminal on earth may be within a coverage area of the ancillary terrestrial component 203 and the second radioterminal on the extraterrestrial body may be outside coverage areas of any ancillary extraterrestrial components, and communications may be relayed therebetween. For example, communications between the first and second radioterminals may be relayed through the ancillary terrestrial component 203, the satellite 201, and the satellite 101. In an alternative, communications between the first and second radioterminals may be relayed through the ancillary terrestrial component 203, the relay station 211, and the satellite 101. In another alternative, communications between the first and second radioterminals may be relayed through the ancillary terrestrial component 203, the satellite 201, the relay station 111, and/or the satellite 101. In still another alternative, communications between the first and second radioterminals may be relayed through the ancillary terrestrial component 203, the satellite 201 and/or the relay station 211, the relay station 111, and/or the satellite 101.

The first radioterminal may be outside a coverage area of any ancillary terrestrial component and the second radioterminal may be within a coverage area of the ancillary extraterrestrial component 103, and communications may be relayed therebetween. For example, communications between the first and second radioterminals may be relayed through the satellite 201, the satellite 101, and/or the ancillary extraterrestrial component 103. In an alternative, communications between the first and second radioterminals may be relayed through the satellite 201, the relay station 211, and/or the satellite 101, and/or the ancillary extraterrestrial component 103. In another alternative, communications between the first and second radioterminals may be relayed through the satellite 201, and/or the relay station 111, and the ancillary extraterrestrial component 103. In yet another alternative, communications between the first and second radioterminals may be relayed through the satellite 201, and/or the relay station 211, the relay station 111, and the ancillary extraterrestrial component 103. In still another alternative, communications between the first and second radioterminals may be relayed through the satellite 201, and/or the relay station 211, the relay station 111, and/or the satellite 101, and the ancillary extraterrestrial component 103.

A first radioterminal on earth may be outside a coverage area of any ancillary terrestrial components and a second radioterminal on the extraterrestrial body may be outside a coverage area of any ancillary extraterrestrial components, and communications may be relayed therebetween. For example, communications between the first and second radioterminals may be relayed through the satellite 201 and the satellite 101. In an alternative, communications between the first and second radioterminals may be relayed through the satellite 201, and/or the relay station 211, and the satellite 101. In another alternative, communications between the first and second radioterminals may be relayed through the satellite 201, and/or the relay station 211, and/or the relay station 111, and/or the satellite 101. In still another alternative, communications between the first and second radioterminals may be relayed through the satellite 201, the relay station 111, and the satellite 101.

As used herein the term radioterminal includes radiotelephones (such as cellular and/or satellite radiotelephones) with or without a multi-line display; Personal Communications System (PCS) terminals that may combine a radiotelephone with data processing, facsimile, and/or data communications capabilities; Personal Digital Assistants (PDA) that can include a radio frequency transceiver and pager, Internet/intranet access, Web browser, organizer, calendar, e-mail transmitter/receiver, and/or global/extraterrestrial positioning system receiver; and/or conventional laptop and/or palmtop computers or other appliances, which include a radio frequency transceiver.

Accordingly, communications systems according to embodiments of the present invention may provide bi-directional communications (such as radiotelephone communications) between a radioterminal on Earth and a radioterminal on an extraterrestrial body such as the Moon or Mars. Moreover, the component(s) providing the link between the Earth and the extraterrestrial body may relay communications therebetween regeneratively and/or non-regeneratively. For example, either one of the ancillary terrestrial component 203, the relay station 211, the satellite 201, the ancillary extraterrestrial component 103, the relay station 111, or the satellite 101 may function as a regenerative and/or a non-regenerative repeater. In addition or in an alternative, communications systems according to embodiments of the present invention may provide unidirectional communications between a radioterminal on Earth and a radioterminal on an extraterrestrial body.

It will be further understood that communications systems and/or methods according to embodiments of the present invention may be implemented to provide communications between two or more extraterrestrial bodies and/or the earth. For example, a communication system such as that illustrated on the extraterrestrial body 105 maybe implemented on the Moon so that communications may be provided between a first radioterminal on the Moon and a second radioterminal on the extraterrestrial body 105 (such as Mars). Moreover, communications systems and/or methods may be implemented on the earth and two or more extraterrestrial bodies to provide communications between radioterminals on any two of the extraterrestrial bodies and/or the earth.

Figure 4:
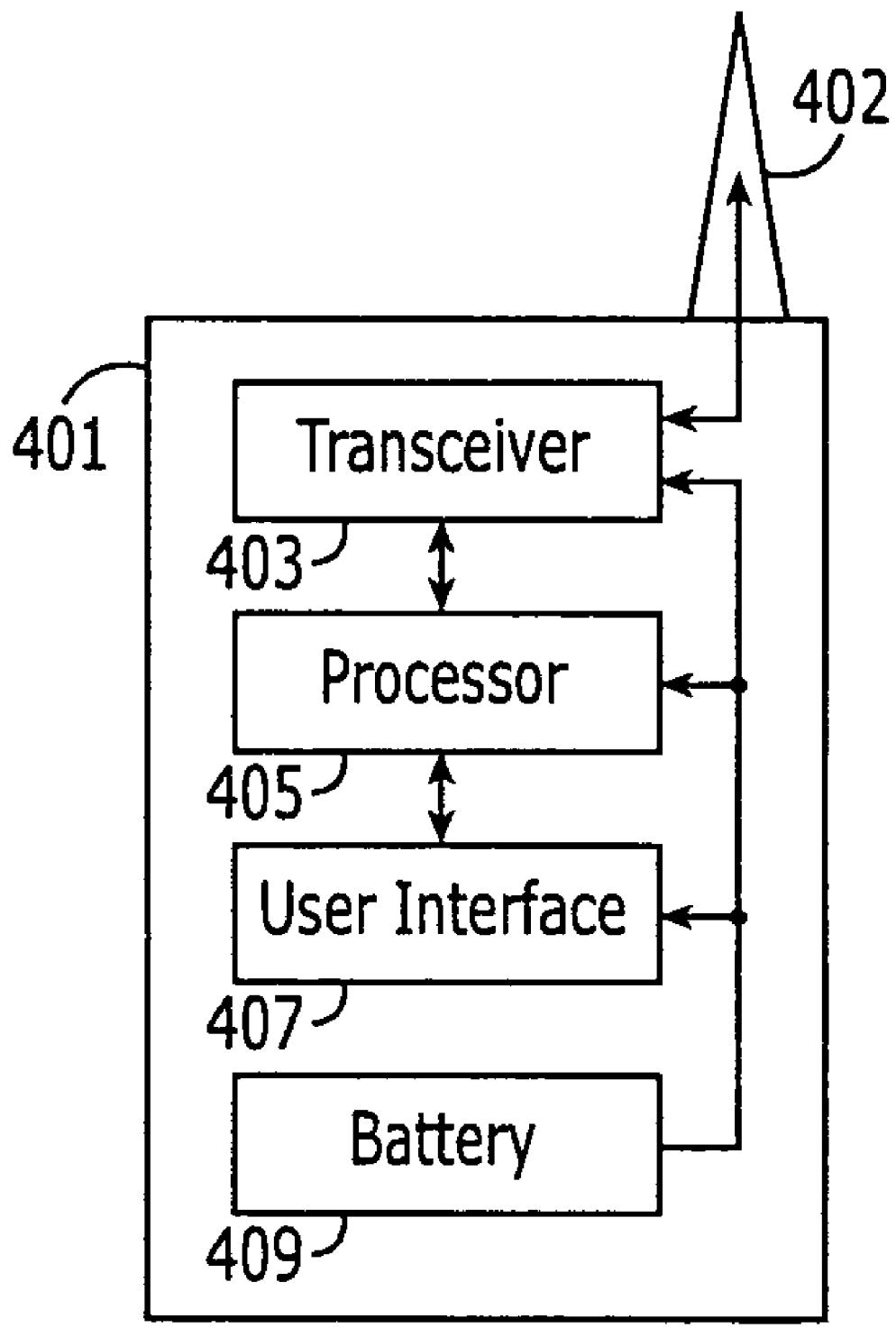
FIG. 4 is a block diagram of mobile terminals and methods according to embodiments of the present invention.

Radioterminals and methods according to embodiments of the present invention are illustrated in FIG. 4. As shown in FIG. 4, a radioterminal 401 may include an antenna 402, a transceiver 403, a processor 405, a user interface 407, and a battery 409 and the radioterminal 401 may be configured for use on earth and/or on an extraterrestrial body using communications systems discussed above with respect to FIGS. 1, 2, and/or 3. For example, substantially the same band of satellite frequencies and/or substantially the same air interface protocol may be used by the space-based and ancillary components of FIGS. 1-3 so that the radioterminal 401 can be used on earth and on the extraterrestrial body using both space-based and ancillary components thereon.

More particularly, the transceiver 403 and antenna 402 may be configured to transmit and receive communications over frequencies of the satellite frequency band used by the ancillary terrestrial components 203 on earth, the space-based network including the satellite 201 orbiting earth, the ancillary extraterrestrial components 103 on the extraterrestrial body, and the space-based network including the satellite 101 orbiting the extraterrestrial body. The processor 405 may be configured to process communications received and/or transmitted by the transceiver 403, and the user interface 407 may be configured to receive input from a user for communications to be transmitted and to provide user output for communications received. The user interface 407, for example, may include a speaker, a microphone, a liquid crystal display, a touch sensitive display, a key pad, a dial, an arrow key, and/or a joy stick.

The radioterminal 401 may thus establish a bidirectional communications pathway with another radioterminal through one or more of an ancillary terrestrial component 203 on earth, an space-based network including the satellite 201 orbiting earth, an ancillary extraterrestrial component 103 on the extraterrestrial body, a space-based network including the satellite 101 orbiting the extraterrestrial body, a relay station 111 on the extraterrestrial body, and/or a relay station 211 on earth. The bidirectional communications pathway, for example, may support an audio radiotelephone communication, a web browsing session, an e-mail transmission, a facsimile transmission, internet/intranet access, and/or a digital data transmission. In an alternative, a unidirectional pathway from one radioterminal to another through one or more elements of FIGS. 1, 2, and/or 3 may support a one way communication such as a page, an e-mail transmission, and/or a facsimile transmission.

If the ancillary and space-based components provide communications on earth and on the extraterrestrial body operatively using substantially the same satellite frequency band and/or substantially the same air interface protocol and/or standard, a same radioterminal with a substantially single transceiver can be used for communication with space-based and ancillary components on earth and on the extraterrestrial body. Accordingly, a duplication of parts in the transceiver 403 for different communications modes can be reduced thereby reducing a cost and/or size of the radioterminal 401. Moreover, power consumed by the transceiver 403 may be reduced by providing communications through ancillary components when available on earth and/or on the extraterrestrial body (instead of requiring all transmissions to go through space-based components). A drain on the battery 409 during transmission to ancillary component(s), compared to during transmission to space-based components, may be reduced so that a life of the battery before discharge may be extended and/or so that a smaller, lighter, and/or cheaper battery may be used.

Radioterminals according to the present invention may be hand-held devices and may be similar in appearance to conventional radiotelephones. When used on an extraterrestrial body, a radioterminal according to embodiments of the present invention may be integrated into a spacesuit, an extraterrestrial roving vehicle, an extraterrestrial landing vehicle, and/or an extraterrestrial living quarter. Moreover, radioterminals according to embodiments of the present invention may be used to transmit data from and/or receive data at an unmanned vehicle and/or station. In addition, communications according to embodiments of the present invention may be provided between a radioterminal and a fixed and/or wired communications device.

In the drawings and specification, there have been disclosed typical preferred embodiments of the invention and, although specific terms are employed, they are used in a generic and descriptive sense only and not for purposes of limitation, the scope of the invention being set forth in the following claims. Moreover, while particular systems are discussed above with respect to the figures, analogous methods are also included in the present invention.

What is claimed is:

1. A communications system composing:
a first space-based component that is configured to provide wireless communications to a plurality of radioterminals located on an extraterrestrial body using frequencies of a first satellite frequency band wherein the first space-based component includes at least one satellite orbiting the extraterrestrial body; and
a first ancillary extraterrestrial component on the extraterrestrial body that is configured to establish first wireless links directly between itself and the first space-based component and directly between itself and a first radioterminal and to use the first wireless links to provide wireless communications between the first radioterminal and a second radioterminal;
wherein the second radioterminal communicates with the first radioterminal via a second ancillary extraterrestrial component on the extraterrestrial body that is configured to establish second wireless links directly between itself and the first space-based component and directly between itself and the second radioterminal; and
wherein the first ancillary extraterrestrial component is further configured to detect transmissions of the second ancillary extraterrestrial component, to establish a link therebetween responsive to having detected the transmissions and to use the link that is established to coordinate frequency reuse, transmission power and/or hand-off of radioterminals with the second ancillary extraterrestrial component.

2. A system according to claim 1 wherein the first space-based component is configured to relay communications between first and second radioterminals on the extraterrestrial body without using any ancillary extraterrestrial components.

3. A system according to claim 1 wherein at least one ancillary extraterrestrial component is configured to relay communications between first and second radioterminals on the extraterrestrial body by using at least one frequency of the first satellite frequency band.

4. A system according to claim 1 wherein an ancillary extraterrestrial component and the first space-based component are configured to relay communications between first and second radioterminals on the extraterrestrial body such that communications between the first and second radioterminals are relayed through both the ancillary extraterrestrial component and the first space-based component.

5. A system according to claim 1 wherein a radioterminal is configured to provide full duplex voice communications.

6. A system according to claim 1 wherein a radioterminal is configured to provide digital data communications.

7. A system according to claim 1 further comprising a plurality of ancillary extraterrestrial components on the extraterrestrial body with each ancillary extraterrestrial component defining a respective wireless communications coverage area on the extraterrestrial body.

8. A system according to claim 7 wherein the plurality of ancillary extraterrestrial components use a plurality of frequencies of the first satellite frequency band wherein the plurality of frequencies are shared among the plurality of ancillary extraterrestrial components according to a frequency reuse pattern to reduce interference between adjacent ancillary extraterrestrial components.

9. A system according to claim 1 further comprising:
a second space-based component that is configured to provide wireless communications to a plurality of radioterminals located on earth over a second satellite frequency band wherein the second space-based component includes at least one satellite orbiting the earth, wherein the first space-based component, the second space-based component, and the ancillary extraterrestrial component are configured to relay communications therebetween via direct wireless links therebetween.

10. A system according to claim 9 further comprising:
an ancillary terrestrial component on earth that is configured to provide wireless communications to a plurality of radioterminals located on earth, wherein the ancillary terrestrial component uses at least one frequency of the first and/or second satellite frequency band, and wherein the second space-based component and the ancillary terrestrial component are configured to relay communications therebetween via direct wireless links therebetween.

11. A system according to claim 10 wherein the first satellite frequency band and the second satellite frequency band comprise substantially the same satellite frequency band.

12. A system according to claim 10 wherein the ancillary extraterrestrial component on the extraterrestrial body and the ancillary terrestrial component on earth are configured to relay communications between a radioterminal on earth and a radioterminal on the extraterrestrial body.

13. A system according to claim 10 wherein the first space-based component and the ancillary terrestrial component are configured to relay communications between a radioterminal on earth and a radioterminal on the extraterrestrial body.

14. A system according to claim 9 wherein the first space-based component and the second space-based component are configured to relay communications between a radioterminal on earth and a radioterminal on the extraterrestrial body.

15. A system according to claim 9 wherein the ancillary extraterrestrial component and the second space-based component are configured to relay communications between a radioterminal on earth and a radioterminal on the extraterrestrial body.

16. An extraterrestrial communications system comprising:
a first space-based component that is configured to provide wireless communications to a first plurality of radioterminals located on an extraterrestrial body wherein the first space-based component includes at least one satellite orbiting the extraterrestrial body;
an ancillary extraterrestrial component on the extraterrestrial body that is configured to provide wireless communications to the first plurality of radioterminals located on the extraterrestrial body, wherein the first space-based component and the ancillary extraterrestrial component are configured to relay communications therebetween and wherein the ancillary extraterrestrial component is configured to detect transmissions of at least one other ancillary extraterrestrial component, to establish a link therebetween responsive to having detected the transmissions and to use the link that is established to coordinate frequency reuse, transmission power and/or hand-off of radioterminals with the at least one other ancillary extraterrestrial component;
a second space-based component that is configured to provide wireless communications to a second plurality of radioterminals located on earth wherein the second space-based component includes at least one satellite orbiting earth; and
an ancillary terrestrial component on earth that is configured to provide wireless communications to the second plurality of radioterminals located on earth, wherein the second space-based component and the ancillary terrestrial component are configured to relay communications therebetween;
wherein the first space-based component, the ancillary extraterrestrial component, the second space-based component, and the ancillary terrestrial component are configured to relay communications between a radioterminal on the extraterrestrial body and a radioterminal on earth such that communications between the radioterminal on the extraterrestrial body and the radioterminal on earth are relayed through at least two of the first space-based component, the ancillary extraterrestrial component, the second space-based component and the ancillary terrestrial component.

17. An extraterrestrial communications system according to claim 16 wherein the first space-based component is configured to provide wireless communications over a first satellite frequency band and wherein the ancillary extraterrestrial component is configured to use at least one frequency of the first satellite frequency band.

18. An extraterrestrial communications system according to claim 17 wherein the second space-based component is configured to provide wireless communications over a second satellite frequency band and wherein the ancillary terrestrial component is configured to use at least one frequency of the second satellite frequency band.

19. An extraterrestrial communications system according to claim 18 wherein the first and second satellite frequency bands comprise substantially the same satellite frequency band.

20. An extraterrestrial communications system according to claim 16 wherein the first space-based component is configured to relay communications between first and second radioterminals on the extraterrestrial body.

21. An extraterrestrial communications system according to claim 16 wherein the ancillary extraterrestrial component is configured to relay communications between first and second radioterminals on the extraterrestrial body.

22. An extraterrestrial communications system according to claim 16 wherein the first space-based component and the ancillary extraterrestrial component are configured to relay communications between first and second radioterminals on the extraterrestrial body such that communications between the first and second radioterminals are relayed through both the ancillary extraterrestrial component and the first space-based component.

23. An extraterrestrial communications system according to claim 16 wherein the radioterminals located on earth and on the extraterrestrial body comprise mobile radioterminals configured to provide full duplex voice communications.

24. An extraterrestrial communications system according to claim 16 wherein the radioterminals located on earth and on the extraterrestrial body are configured to provide digital data communications.

25. An extraterrestrial communications system according to claim 16 wherein the ancillary extraterrestrial component is one of a plurality of ancillary extraterrestrial components on the extraterrestrial body with each ancillary extraterrestrial component defining a respective wireless communications coverage area on the extraterrestrial body.

26. An extraterrestrial communications system according to claim 25 wherein the first space-based component is configured to provide wireless communications over a first satellite frequency band, wherein the ancillary extraterrestrial component is configured to use a plurality of frequencies of the first satellite frequency band, and wherein the plurality of frequencies are shared among the plurality of ancillary extraterrestrial components according to a reuse pattern to reduce interference between adjacent extraterrestrial components.

27. An extraterrestrial communications system according to claim 16 wherein the ancillary extraterrestrial component on the extraterrestrial body and the ancillary terrestrial component on earth are configured to relay communications between a radioterminal on earth and a radioterminal on the extraterrestrial body such that communications between the radioterminal on earth and the radioterminal on the extraterrestrial body are relayed through both the ancillary extraterrestrial component and the ancillary terrestrial component.

28. An extraterrestrial communications system according to claim 16 wherein the first space-based component and the second space-based component are configured to relay communications between a radioterminal on earth and a radioterminal on the extraterrestrial body such that communications between the radioterminal on earth and the radioterminal on the extraterrestrial body are relayed through both the first space-based component and the second space-based component.

29. An extraterrestrial communications system according to claim 16 wherein the first space-based component and the ancillary terrestrial component are configured to relay communications between a radioterminal on earth and a radioterminal on the extraterrestrial body such that communications between the radioterminal on earth and the radioterminal on the extraterrestrial body are relayed through both the first space-based component and the ancillary terrestrial component.

30. An extraterrestrial communications system according to claim 16 wherein the ancillary extraterrestrial component and the second space-based component are configured to relay communications between a radioterminal on earth and a radioterminal on the extraterrestrial body such that communications between the radioterminal on earth and the radioterminal on the extraterrestrial body are relayed through both the ancillary extraterrestrial component and the second space-based component.

31. A communications system comprising:
a space-based component that is configured to provide wireless communications to a plurality of radioterminals located on earth over a first satellite frequency band wherein the space-based component includes at least one satellite orbiting earth; and
an ancillary terrestrial component on earth that is configured to provide wireless communications to with the plurality of radioterminals located on earth;
wherein the ancillary terrestrial component uses at least one frequency of the first satellite frequency band, is configured to detect transmissions of at least one other ancillary terrestrial component, to establish a link therebetween responsive to having detected the transmissions and to use the link that is established to coordinate frequency reuse, transmission power and/or hand-off of radioterminals with the at least one other ancillary terrestrial component; and
wherein the space-based component and the ancillary terrestrial component are configured to relay communications therebetween and at least one of the space-based component and the ancillary terrestrial component is configured to relay communications between one of the plurality of radioterminals located on earth and a radioterminal located on an extraterrestrial body.

32. A communications system according to claim 31 further comprising:
a second space-based component that is configured to provide wireless communications to a plurality of radioterminals located on the extraterrestrial body over a second satellite frequency band wherein the second space-based component includes at least one satellite orbiting the extraterrestrial body, wherein the first space-based component, the second space-based component, and the ancillary terrestrial component are configured to establish direct wireless communications links therebetween and to relay communications therebetween using the direct wireless communications links.

33. A communications system according to claim 32 further comprising:
an ancillary extraterrestrial component on the extraterrestrial body that is configured to provide wireless communications to the plurality of radioterminals located on the extraterrestrial body, wherein the ancillary extraterrestrial component uses at least one frequency of the second and/or first satellite frequency band, and wherein the second space-based component and the ancillary extraterrestrial component are configured to establish direct wireless links therebetween and to relay communications therebetween using the direct wireless links.

34. A communications system according to claim 33 wherein the first satellite frequency band and the second satellite frequency band comprise substantially the same satellite frequency band.

35. A method of operating a communications system comprising a space-based component including at least one satellite orbiting an extraterrestrial body and an ancillary extraterrestrial component on the extraterrestrial body, the method comprising:
providing wireless communications by the space-based component to a plurality of radioterminals located on the extraterrestrial body over a satellite frequency band;
providing wireless communications by the ancillary extraterrestrial component to the plurality of radioterminals located on the extraterrestrial body, wherein the ancillary extraterrestrial component uses at least one frequency of the satellite frequency band;
establishing direct wireless links between the space-based component and the ancillary extraterrestrial component and relaying communications between the space-based component and the ancillary extraterrestrial component using the direct wireless links; and
detecting by the ancillary extraterrestrial component transmissions of at least one other ancillary extraterrestrial component, establishing a link therebetween responsive to the detecting and coordinating with the at least one other ancillary extraterrestrial component, using the link that is established, frequency reuse, transmission power and/or hand-off of radioterminals.

36. A method of operating a communications system comprising a first space-based component including at least one satellite orbiting an extraterrestrial body, an ancillary extraterrestrial component on the extraterrestrial body, a second space-based component including at least one satellite orbiting earth, and an ancillary terrestrial component on earth, the method comprising:
providing wireless communications by the first space-based component to a plurality of radioterminals located on the extraterrestrial body;
providing wireless communications by the ancillary extraterrestrial component to the plurality of radioterminals located on the extraterrestrial body;
establishing direct wireless links between the first space-based component and the ancillary extraterrestrial component and relaying communications between the first space-based component and the ancillary extraterrestrial component using the direct wireless links;
providing wireless communications by the second space-based component to a plurality of radioterminals located on earth;
providing wireless communications by the ancillary terrestrial component to the plurality of radioterminals located on earth;
establishing direct wireless communications links between the second space-based component and the ancillary terrestrial component and relaying wireless communications therebetween using the direct wireless communications links;

detecting by the ancillary extraterrestrial component transmissions of at least one other ancillary extraterrestrial component, establishing a link therebetween responsive to the detecting and coordinating with the at least one other ancillary extraterrestrial component, using the link that is established, frequency reuse, transmission power and/or hand-off of radioterminals; and relaying communications between a radioterminal on the extraterrestrial body and a radioterminal on earth such that communications between the radioterminal on the extraterrestrial body and the radioterminal on earth are relayed through at least two of the first space-based component, the ancillary extraterrestrial component, the second space-based component and the ancillary terrestrial component.

37. A method of operating a communications system comprising a space-based component including at least one satellite orbiting earth, and an ancillary terrestrial component on earth, the method comprising:

providing wireless communications by the space-based component to a plurality of radioterminals located on earth using service link frequencies of a satellite frequency band;

providing wireless communications by the ancillary terrestrial component to the plurality of radioterminals located on earth using service link frequencies of the satellite frequency band;

relaying communications between the space-based component and the ancillary terrestrial component;

detecting by the ancillary terrestrial component transmissions of at least one other ancillary terrestrial component, establishing a link therebetween responsive to the detecting and coordinating with the at least one other ancillary terrestrial component, using the link that is established responsive to the detecting, frequency reuse, transmission power and/or hand-off of radioterminals; and relaying communications between one of the plurality of radioterminals located on earth and a radioterminal located on an extraterrestrial body using the space-based component and the ancillary terrestrial component.

* * * * *

UNITED STATES PATENT AND TRADEMARK OFFICE
CERTIFICATE OF CORRECTION

PATENT NO. : 7,418,236 B2  Page 1 of 1
APPLICATION NO. : 10/827961
DATED : August 26, 2008
INVENTOR(S) : Levin et al.

It is certified that error appears in the above-identified patent and that said Letters Patent is hereby corrected as shown below:

Column 25, Claim 31, Line 35: Please delete "with" after "communications to"

Signed and Sealed this

Twenty-eighth Day of October, 2008

JON W. DUDAS
*Director of the United States Patent and Trademark Office*